United States Patent [19]

Keskilohko

[11] Patent Number: 4,706,582

[45] Date of Patent: Nov. 17, 1987

[54] PLANTING DEVICE FOR PLANTS

[75] Inventor: Altti K. Keskilohko, Iso-Vimma, Finland

[73] Assignee: Lännen Tehtaat Oy, Iso-Vimma, Finland

[21] Appl. No.: 820,321

[22] Filed: Jan. 21, 1986

[30] Foreign Application Priority Data

Feb. 8, 1985 [FI] Finland .................................. 850549

[51] Int. Cl.$^4$ ............................................. A01C 11/00
[52] U.S. Cl. ............................................. 111/4; 111/98
[58] Field of Search ........................ 111/4, 7.1, 92–98; 254/132; 294/50.8, 50.9

[56] References Cited

U.S. PATENT DOCUMENTS

| | | | |
|---|---|---|---|
| 669,841 | 3/1901 | Koeth | 294/50.8 |
| 1,322,537 | 11/1919 | Cartwright | 294/50.9 |
| 1,328,063 | 1/1920 | St. John | 294/50.8 |
| 2,165,663 | 7/1939 | Thomas | 111/4 |
| 2,575,638 | 11/1951 | Price | 294/50.9 |
| 2,749,088 | 6/1956 | Jennens | 254/132 |
| 2,891,813 | 6/1959 | Inaki | 111/4 |
| 3,482,868 | 12/1969 | Witt | 294/50.9 |
| 3,526,424 | 9/1970 | Torres | 294/50.8 |
| 3,749,034 | 7/1973 | Bergius et al. | 111/4 |
| 3,990,146 | 11/1976 | Asselta | 294/50.9 |
| 4,444,131 | 4/1984 | Marttinen | 111/4 |
| 4,545,189 | 10/1985 | Nelson | 294/50.9 |

FOREIGN PATENT DOCUMENTS 49583 11/1889 Fed. Rep. of Germany ..... 294/50.9

*Primary Examiner*—Robert A. Hafer
*Assistant Examiner*—Danton DeMille
*Attorney, Agent, or Firm*—Burns, Doane, Swecker & Mathis

[57] ABSTRACT

Planting device for plants, which comprises a frame tube (1), a stationary jaw (6) and a pivoting jaw (7) in contact with same, with a foot pedal (8), as well as a catch and discharge device (3), which is provided with a trigger lever (12) as well as with a spring (13). The trigger lever is in one of its extreme positions when the pivoting jaw is open, and in the other extreme position when the pivoting jaw is closed. The spring is fitted so as to lock the trigger lever—and thereby also the pivoting jaw—in any of the extreme positions.

16 Claims, 6 Drawing Figures

Fig.1a.
Fig.1b.
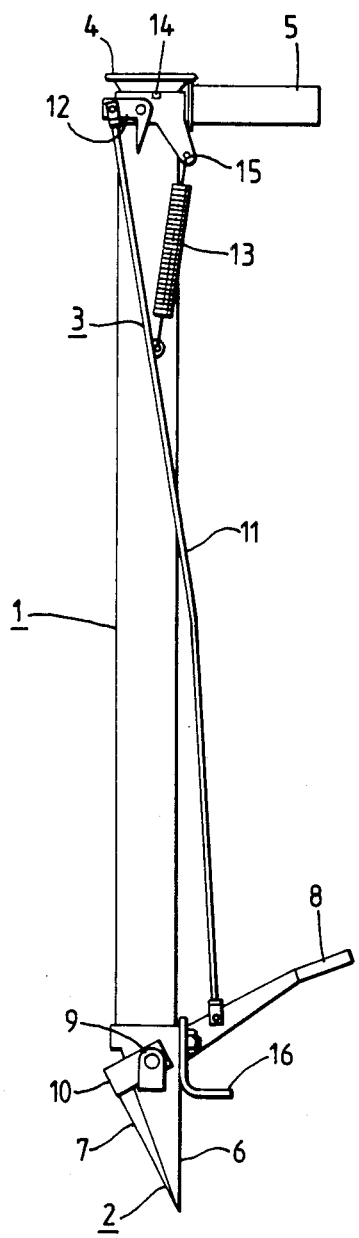
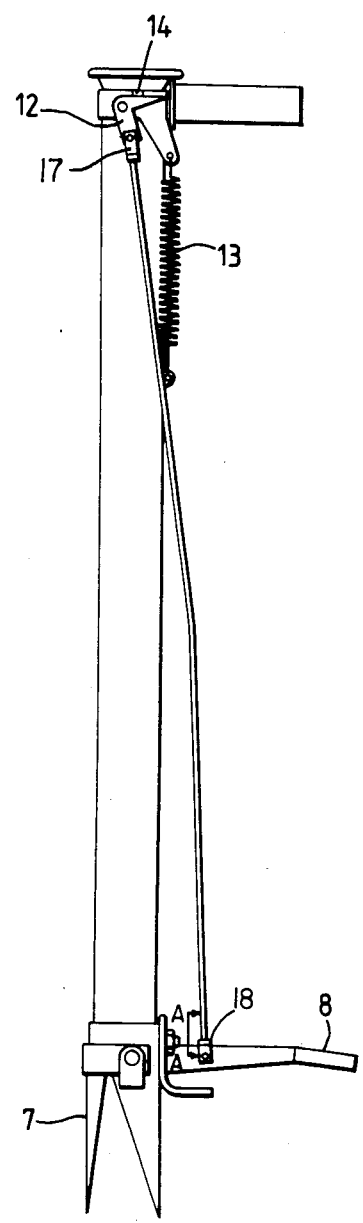

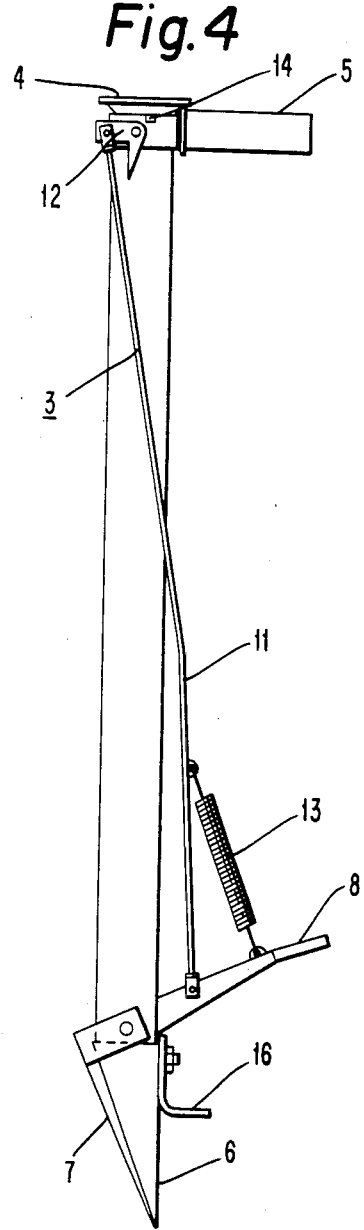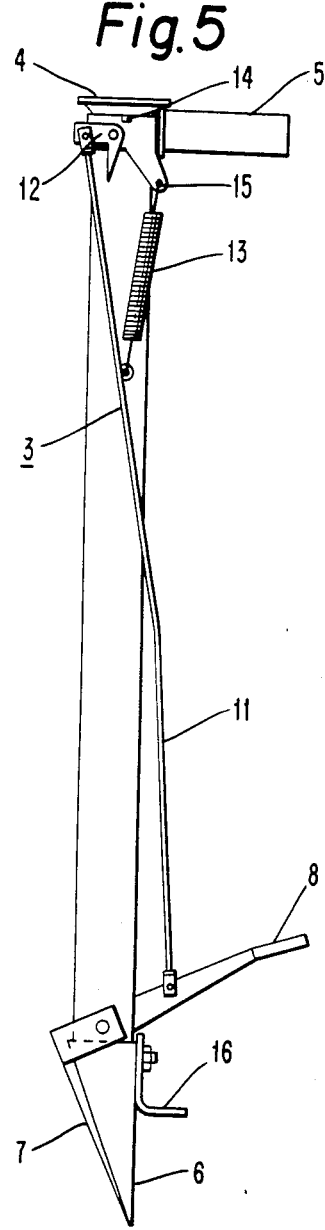

PLANTING DEVICE FOR PLANTS

BACKGROUND OF THE INVENTION

The present invention is concerned with a planting tube for plants, at whose bottom end there is a blade consisting of jaws, which said jaws can be opened by depressing a foot lever. A planting tube is used in particular in forest planting when ball plants are planted.

From the Finnish Pat. No. 50,033 (equivalent, e.g., of the U.S. Pat. No. 3,749,034) a planting device for plants is known which comprises a frame tube, at its bottom end a stationary jaw, and a pivoting jaw mounted in contact with the stationary jaw, the said jaws constituting a blade to be pressed into the ground. The pivoting jaw is connected with a foot lever, by whose depression the blade pushed into the ground is opened and a planting recess is formed in the ground. The plant to be planted is dropped through the open mouth of the tube into the planting pit. The planting device is further provided with a catch and discharge device for keeping the pivoting jaw open and for its releasing back to the closed position. The catch and discharge device includes a hook member operating by means of the force of a spring, which said hook member locks the opened pivoting jaw in the open position and which can be released by the intermediate of a discharge rod connected with the hook member and extending to the top portion of the tube.

The hook member is mounted on the tube, and it is pressed against the pivoting jaw by a spiral spring fitted around the journalling pin. The hook member is provided with a notch, and the pivoting jaw with a counter-piece for the said notch. Moreover, the planting tube includes a spring, by means of which the pivoting jaw is closed. The spring is a draw spring fitted between the foot lever and the tube.

A drawback of this device is the relatively high force required for releasing the pivoting jaw, owing to the friction in the catch mechanism. A modification of the tube described above is also known, in which the hook member is mounted on the pivoting jaw and the counter-piece for the notch on the hook member is placed in the top portion of the tube. By in this way placing a part of the catch and discharge device in the top portion of the tube, it has been possible to reduce the damage caused by brushwood and rocks on the mechanism. This device, however, also involves the drawback of the high force required for releasing the pivoting jaw.

OBJECTS AND SUMMARY

Thus, the object of the present invention is above all to provide a planting tube in which the releasing of the pivoting jaw is easier than in the prior-art planting tubes.

The planting device according to the invention comprises a frame tube, a stationary jaw, a pivoting jaw, and a catch and discharge device. The most essential feature is that the catch and discharge device related to the pivoting jaw is provided with a trigger lever, whose extreme positions correspond to the open and closed positions of the jaw, and that, by means of the spring closing the jaw, the trigger lever—and, thus, at the same time also the jaw—can be locked in its open or closed position.

The trigger lever may be placed on the pivoting jaw, on the foot lever, or on the frame tube.

The trigger lever is, however, placed best by mounting it on the tube at its top end. At one end of the lever, a rod is linked whose opposite end is linked on the pivoting jaw or on the foot lever.

The closing spring for the jaw is preferably a draw spring, one of whose ends is attached to the rod whereas the other end of the spring is attached to the tube.

Above all, it is an advantage of the device in accordance with the invention that the operation of the lever requires little force, whereby the planting work becomes easier and more rapid.

A preferred embodiment of the invention will be illustrated in the following with the aid of the accompanying drawings.

BRIEF DESCRIPTION OF THE DRAWINGS

FIG. 1a shows the planting tube with the jaws closed, and

FIG. 1b shows the same tube with the jaws open.

FIGS. 3-5 show alternative embodiments of the planting tube according to the present invention.

DETAILED DESCRIPTION

Figure 2:
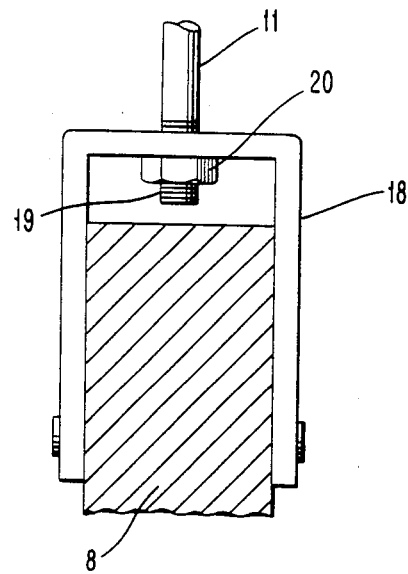
FIG. 2 shows a detailed view taken along line A—A of FIG. 1b.
Figure 3:
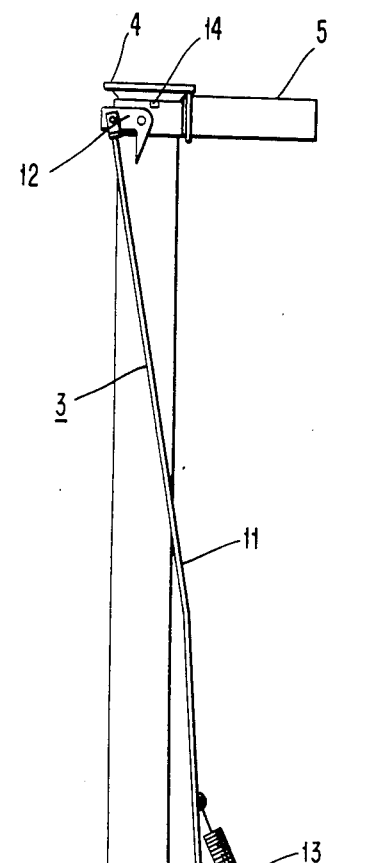
Figure 3:
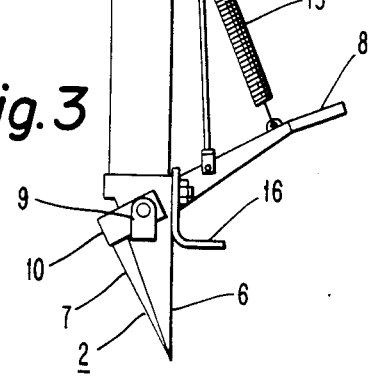

The main parts of the planting tube are the frame tube 1, the blade part 2, and the catch and releasing device 3.

The frame tube 1 is a tube of circular section whose top and bottom ends are open. At the top end of the tube, there is a funnel-shaped widening 4, which facilitates the placing of a plant into the tube. Also, at the top end of the tube, there is a handle 5. The diameter of the tube is chosen so that it is somewhat larger than the diameter of the ball of the plants to be planted. The height is preferably such that the planter can work without bending.

The blade part 2 consists of a stationary jaw 6 and of a pivoting jaw 7 with foot lever 8.

The stationary jaw 6 is fixed as an extension of the bottom portion of the tube at the side of the tube where the handle 5 is, i.e. at the rear side. Its shape is that of a wedge-shaped piece cut off out of a cylinder face, the tip being directed downwards. A different shape may also be concerned very well, depending on the desired shape of the planting pit or on the nature of the soil.

On the stationary jaw 6, in its top portion, there are two horizontal pins 9 at opposite sides. On these pins, a bracket 10 is mounted, one of whose branches is considerably longer and forms a foot lever 8, which extends to the rear side of the tube.

To the loop of the bracket 10, the pivoting jaw 7 is attached, whose shape corresponds to the shape of the stationary jaw 6. The jaws are placed so that, when in the closed position, they form a wedge-shaped blade. When the pivoting jaw 7 is opened, an opening corresponding to the diameter of the tube is formed.

The catch and discharge device 3 comprises a rod 11, a trigger lever 12, and a draw spring 13.

The trigger lever 12 is a piece having substantially a shape of a wide V, which is mounted by its angle point, with the branches directed downwards, on the top portion of the tube at the left side of the handle 5. The lever 12 can revolve rearwards only up to the point where the rear branch of the lever meets a trigger limiter 14 projecting from the frame.

The shape of the rod 11 is curved, and its top end is mounted by means of a fork 17 on the front branch of the trigger lever 12, and the bottom end by means of a fork 18 on the foot lever 8 at the rear side of the tube.

The bottom end of the spring 13 is attached to the rod 11, and the top end to an ear 15 on the tube. The spring 13 attempts to pull the rod 11 upwards and, in this way, to close the jaws 6 and 7 of the blade and, at the same time, to lock the lever 12 at either one of its extreme positions. The rod 11, the trigger lever 12, and the limiter 14 are dimensioned and placed in such a way that, when the trigger lever rests on the limiter, the pivoting jaw 7 is open over a distance equalling the width of the planting pit. By changing the length of the rod, it is possible to adjust the width of the opening. For this purpose, there are adjusting threadings 19 and nuts 20 at both ends of the rod, by means of which the rod is fitted into the holes in the attaching forks 17 and 18.

The dimensioning is preferably such that the movement of the lever from the position of balance to the rear extreme position is considerably shorter than the movement to the front extreme position. In this way, the pivoting jaw 7 does not have to be pivoted more than just slightly beyond its planting position.

The parts of the catch and discharge device may, of course, also be placed in a sequence different from that described above, and they may have different shapes. For example, the rod may be attached to the foot lever at the front side of the tube, whereby, correspondingly, the spring must be placed so as to pull he rod downwards, and the location of the trigger lever must be changed accordingly. In particular, the shape and the place of location of the trigger lever may also be varied.

The spring may also be chosen and located in different ways.

The planting tube may be manufactured of an appropriate steel. If a low weight is desired, e.g., the frame of the tube may be made of aluminum or of an appropriate plastic.

Moreover, on the planting tube, in the top portion of the stationary jaw 6, there is a projecting limiter 16 of the planting depth, which may also be used as a pedal when the tube is pushed into the ground. The limiter 16 is displaceable in the vertical direction. In this way, it is possible to adjust the depth of the planting pit.

When plants are being planted, the tube is pressed into the ground with the blade closed (FIG. 1a). Once the blade has been pressed into the desired depth, the foot lever 8 is depressed until the pivoting jaw 7 is open (FIG. 1b). Thereby the spring 13 locks the trigger lever in the rear extreme position against the limiter 14. In this way, the pivoting jaw 7 is locked in the open position, and the plant can be dropped through the tube into the planting pit.

After the plant has been dropped into the pit, the tube is lifted up and, if necessary, the soil is compacted around the plant. When the rear branch of the trigger lever 12 is depressed slightly, the lever is returned by means of the spring 13 to its front extreme position, and the jaw 7 is closed.

What is claimed is:

1. Planting device for plants, which comprises:
    a frame tube open at its top and bottom ends;
    a stationary jaw constituting an extension of the bottom end of the tube; and
    a pivoting jaw with foot lever, which said pivoting jaw is mounted to one of the bottom portion of the tube and the stationary jaw and the pivoting jaw is in contact with the stationary jaw;
    said jaws, when in the closed position, form a wedge-shaped blade and, when in the open position, form an opening larger than the width of a plant ball to be planted;
    said device including a catch and discharge device for keeping the pivoting jaw in its open position and for releasing it into its closing position, which said catch and discharge device includes a rod and a spring said spring being connected between the rod and one of the tube and the pivoting jaw with foot lever so as to urge the pivoting jaw into its closing position;
    the catch and discharge device further including a trigger lever having branches and being pivotable between a first and second extreme position, said rod interconnecting one of the branches with the pivoting jaw with foot lever such that when the pivoting jaw is in the closed position, the lever is in its first extreme position and, when the pivoting jaw is open, the lever is in its second extreme position;
    said spring being in combination with the trigger lever so as to urge the lever into locking engagement in either one of its extreme positions.

2. Device as claimed in claim 1, wherein the trigger lever is mounted on the frame tube.

3. Device as claimed in claim 2, wherein the rod is linked on one branch of the trigger lever, the other end of the said rod being linked on the pivoting jaw with foot lever.

4. Device as claimed in claim 3, wherein the bottom end of the rod is mounted on the foot lever at a free-end side of the foot lever.

5. Device as claimed in claim 3, wherein the trigger lever is a substantially V-shaped piece having a bend and two branches, which is mounted at its bend and on one of whose branches the top end of the rod is mounted.

6. Device as claimed in claim 5, wherein the trigger lever is mounted with the branches pointing downwards.

7. Device as claimed in claim 1, wherein the spring is attached to the frame tube.

8. Device as claimed in claim 3, wherein the foot lever is placed at the side of the extension of the frame tube and that the trigger lever is at the top end of the tube.

9. Device as claimed in claim 3, wherein the length of the rod is adjustable.

10. Device as claimed in claim 4, wherein the trigger lever is a substantially V-shaped piece having a bend and two branches, which is mounted at its bend and on one of whose branches the top end of the rod is mounted.

11. Device as claimed in claim 4, wherein the foot lever is placed at the side of the extension of the frame tube and that the trigger lever is at the top end of the tube 12. Device as claimed in claim 5, wherein the foot lever is placed at the side of the extension of the frame tube and that the trigger lever is at the top end of the tube.

13. Device as claimed in claim 6, wherein the foot lever is placed at the side of the extension of the frame tube and that the trigger lever is at the top end of the tube.

14. Device as claimed in claim 1, wherein the foot lever is placed at the side of the extension of the frame tube and that the trigger lever is at the top end of the tube.

15. Device as claimed in claim 7, wherein the foot lever is placed at the side of the extension of the frame and that the lever is at the top end of the tube.

16. Device as claimed in claim 4, wherein the length of the rod is adjustable.

* * * * *